UNITED STATES PATENT OFFICE.

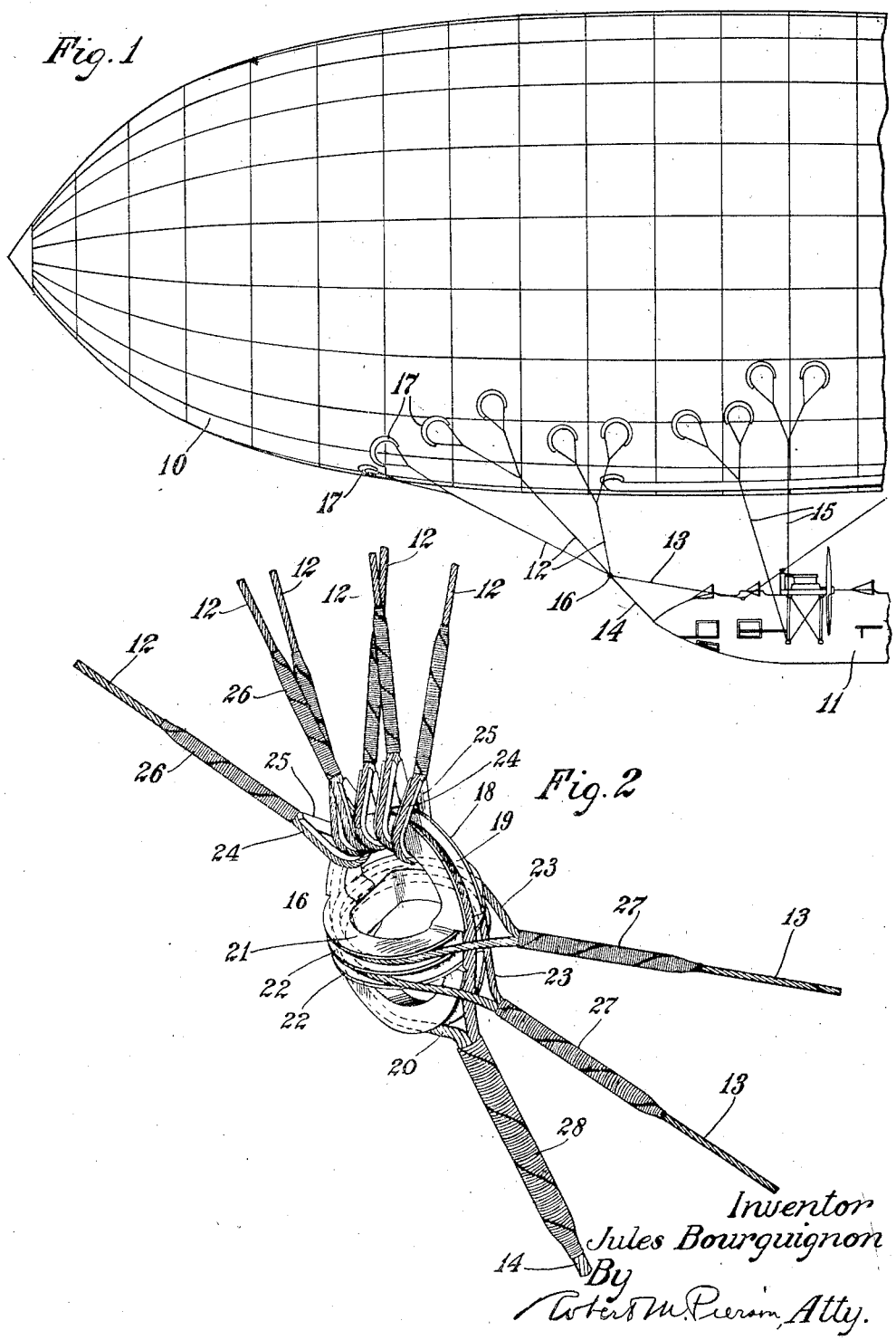

JULES BOURGUIGNON, OF BILLANCOURT, FRANCE, ASSIGNOR TO THE B. F. GOODRICH COMPANY, OF NEW YORK, N. Y., A CORPORATION OF NEW YORK.

STAY-CABLE JUNCTION.

1,359,571.  Specification of Letters Patent.  Patented Nov. 23, 1920.

Application filed October 12, 1918. Serial No. 257,823.

*To all whom it may concern:*

Be it known that I, JULES BOURGUIGNON, a citizen of France, and resident of Billancourt, in the Department of Seine, France, have invented a certain new and useful Stay-Cable Junction, of which the following is a specification.

This invention relates to means for connecting the ends of ropes or cables such as those used in the suspending rigging for the car of an airship. The object of my invention is to provide a form of connection which will enable a considerable number of ropes, cords, stays or cables to be brought to a common junction point and interlooped with each other in such manner as to allow for the necessary freedom of movement without chafing, and also prevent the severing of the connection in case of any breakage short of actual parting of the loops.

Of the accompanying drawings,—

Figure 1 is a side elevation showing one end of a dirigible balloon having a car suspension provided with my improved cable connection.

Fig. 2 is a perspective view of the cable connection.

In the drawings, 10 is the gas-bag of the balloon, and 11 is the car suspended therefrom by a series of wire stays or cables 12, 13, 14, 15. As here shown, the cables 12 are six in number, three on each side, extending from the common junction point or connector 16 and branching to a series of attaching members 17 on the gas bag. From the connector 16, which includes the loops and the loop-filler or "concentrator" hereinafter referred to, a pair of cables 13 lead to the sides of the car 11 near the bow, and a single cable 14 leads to the extreme point or nose of said car.

The connector includes a compound loop-filler or concentrator which may be a single metal casting consisting of two rings at right-angles to each other. Ring 18 in the vertical plane has a single peripheral groove 19 occupied by a loop 20 on the end of the cable 14, which therefore embraces said ring in the plane thereof, while the ring 21 in the horizontal plane is formed with a pair of parallel grooves 22 occupied by similar loops 23 on the ends of the cables 13, these loops also embracing their ring in the plane thereof. The several loops are free to slide in their grooves so as to provide a flexible connection in which the suspending strains are properly distributed. The circles of the bottoms of the grooves 22 pass within the circle of the bottom of the groove 19, so that the loop 20 is interlinked with the loops 23, its near limb as viewed in Fig. 2 lying within the crotches of the loops 23, while its remote limb must pass outside of said loops 23, as indicated by the broken lines, by reason of such relation of the grooves 19 and 22. Loop 20 is likewise interlinked with all of a series of loops 24 which are formed on the lower ends of the cables 12 and are lined with eyes or wearing plates 25. Through the opening of the latter passes the upper bow or arch of the vertical ring 18. Although they all fasten on the common loop-filler 18, 21, these connections are independent of each other and chafing is avoided. It will be observed that the term "ring" is here used in the sense of a circular or other member which need be of perforate form only to the extent that it is desired to attach loops such as the ones 24, which are strung on a limb, bar or arch of the compound filler member.

In assembling the connections, the splices 26 of the cables 12 are made after the ends of said cables have been looped around the upper limb of ring 18. The splices 27 of the cables 13 or the splice 28 of the cable 14 are left open until these cables have been assembled with the filler and interlooped with each other, and likewise the splices 26 or 28 are left open until their interlooping and assembling is performed. In case the filler 18, 21 should break, the cable ends would still remain connected, and thus a maximum degree of safety is provided.

I claim:

1. A series of cables having interlinked loops at their ends, and a loop-filler having loop-receiving peripheral grooves in different planes, a said groove in one plane lying within the circuit of a said groove in another plane.

2. A connector comprising a compound filler having grooved rings in intersecting planes, cables having interlinked loops occupying the grooves in said rings, and another cable having a loop interlinked with one of the rings.

3. The combination of a balloon body, a car, suspending cables leading from said body and car to a common junction point, and a connection at said point comprising interlinked loops on the ends of the cables, and a ring structure embraced by one or more, and interlinked with one or more of the loops and having separate bearing surfaces therefor.

4. A connecting-ring structure for interlinked cable loops comprising peripheral grooved members in intersecting planes, one of said members including an arch for interlinking with certain of the loops.

In testimony whereof I have hereunto set my hand this 10 day of October, 1918.

JULES BOURGUIGNON.